United States Patent

Inoguchi et al.

[11] Patent Number: 5,854,142
[45] Date of Patent: Dec. 29, 1998

[54] LAMINATED PLATE MATERIAL AND LOOM HARNESS FRAME MANUFACTURED THEREFROM

[75] Inventors: Hirokazu Inoguchi; Mikiya Fujii, both of Fukushima; Haruo Matsushima, Kurobe; Yoshinori Masuda; Yoshiharu Tanaka, both of Toyama-ken, all of Japan

[73] Assignee: YKK Corporation, Tokyo, Japan

[21] Appl. No.: 649,076

[22] Filed: May 16, 1996

[30] Foreign Application Priority Data

May 17, 1995 [JP] Japan .................................... 7-141376

[51] Int. Cl.⁶ .................................................... D03C 9/06
[52] U.S. Cl. ............................. 442/233; 139/11; 139/91; 442/234
[58] Field of Search ..................... 442/233, 234; 139/11, 91

[56] References Cited

U.S. PATENT DOCUMENTS

| | | |
|---|---|---|
| 3,939,024 | 2/1976 | Hoggatt . |
| 4,476,900 | 10/1984 | Bowen . |
| 4,888,247 | 12/1989 | Zweben et al. ........................ 428/105 |
| 5,071,702 | 12/1991 | Matsuura et al. ...................... 428/290 |
| 5,100,722 | 3/1992 | Nakamura et al. .................... 428/263 |
| 5,312,691 | 5/1994 | Even et al. ............................ 428/458 |
| 5,429,326 | 7/1995 | Garesché ............................... 244/133 |
| 5,507,321 | 4/1996 | Kutsukake et al. . |

FOREIGN PATENT DOCUMENTS

| | | |
|---|---|---|
| 0 155 820 A2 | 9/1985 | European Pat. Off. . |
| 0 285 974 A2 | 10/1988 | European Pat. Off. . |
| 26 42 882 A1 | 3/1978 | Germany . |
| 58-31904 | 7/1983 | Japan . |
| 58-48383 | 11/1983 | Japan . |
| 58-48384 | 11/1983 | Japan . |
| 7-70864 | 3/1995 | Japan . |
| 525 305 | 7/1972 | Switzerland . |
| 2 038 239 | 7/1980 | United Kingdom . |

OTHER PUBLICATIONS

Database WPI, Section Ch, Week 8748, Derwent Publications Ltd., London, GB; Class A32, An 87–337195, XP002056830 and JP 62 240 541 A (Matsushita Electric Works Ltd), 12, Oct. 1987.

*Primary Examiner*—Christopher Raimund
*Attorney, Agent, or Firm*—Hill & Simpson

[57] ABSTRACT

A harness frame of light weight manufactured from a laminated plate material is disclosed. The laminated plate material comprises (a) a composite material layer comprising a resin matrix and a reinforcing layer formed of reinforcing fibers and (b) metallic layers superposed one each on the opposite surfaces of the composite material layer. In a preferred mode, resin sheets and reinforcing layers of reinforcing fibers are alternately superposed, two metallic layers are set in place one each on the vertically opposite surfaces of the superposed layers, and the layers are heated and compressed with a pressing machine to induce thermal welding of the component layers. The laminated plate material has the metallic layers superposed with high adhesive strength on the opposite surfaces of a composite material layer having a plurality of reinforcing layers embedded in a resin matrix.

7 Claims, 6 Drawing Sheets

LAMINATED PLATE MATERIAL AND LOOM HARNESS FRAME MANUFACTURED THEREFROM

BACKGROUND OF THE INVENTION

1. Field of the Invention

This invention relates to a laminated plate material formed of a metal layer and a fiber-reinforced resin composite material layer. This invention further relates to a loom harness frame which is manufactured from the laminated plate material.

2. Description of the Prior Art

Narrow tapes such as the slide fastener tapes which are used in various textile goods are generally manufactured by narrow looms (such as, for example, ribbon looms or needle looms). The method for weaving the narrow tapes is basically the same as the method for producing ordinary woven fabrics. The shedding of a warp is performed by a plurality of harnesses which are laid parallelly in a direction perpendicular to the warp threads and are each composed of a plurality of healds or heddles for passing and retaining warp threads and a harness frame for retaining the healds. These harnesses are raised and lowered by means of a cam mechanism. Japanese U.M. Publication No. 58-48,383, for example, discloses a shedding device which has laterally paired rotary shafts parallelly disposed below a group of a plurality of harness frames parallelly disposed in a longitudinal direction, the rotary shafts each provided with one half as many plate cams as the harness frames disposed as staggered laterally and opposed to the relevant harness frames, supporting parts severally of the harness frames connected to the terminal parts of the corresponding followers adapted to be moved vertically in response to the rotation of the relevant plate cams and which, therefore, permits the length required for arranging the group of harness frames in the longitudinal direction to be decreased to nearly one half of the length normally required heretofore without requiring a change in the unit thickness of the plate cams.

Harness frames of varying structures have been proposed for use in the shedding device of this kind. Japanese U.M. Publication No. 58-31,904, for example, proposes a harness which is endowed with an ability to prevent heald shafts from oscillating or sustaining breakage by causing a connecting member made of an elastic sheet of metal or hard synthetic resin to form fast connection between the opposed free ends of the heald shafts and, at the same time, causing the same connecting member to form fast connection between the free ends of the heald shafts and a harness frame. Japanese U.M. Publication No. 58-48,384 proposes a harness which is enabled to confine the motion of healds by causing a heald retaining member to be fixed with screws to a harness frame, with the lateral edge part of the heald retaining member held in contact with one end of each of a plurality of healds attached to a heald shaft.

Figure 1:
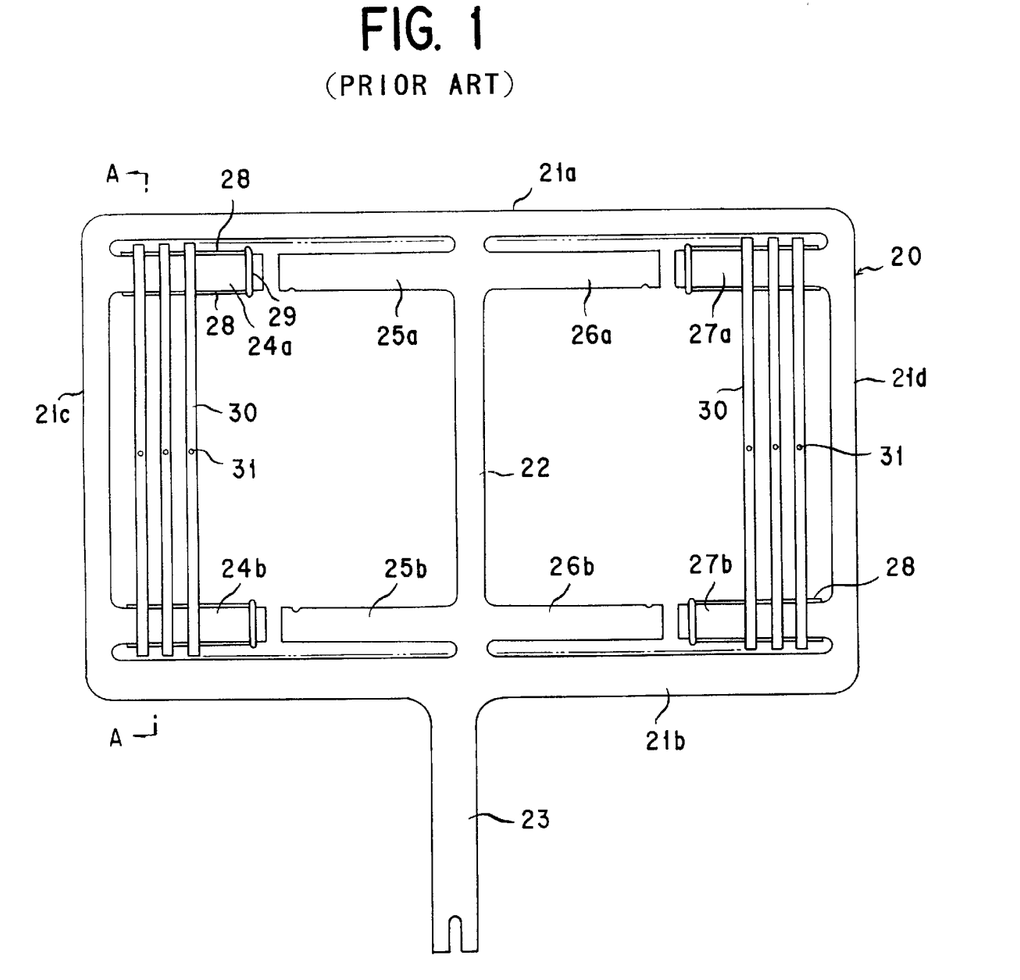
FIG. 1 is a plan view showing one example of the harness frame which is used in a conventional shedding device for a warp.
Figure 2:
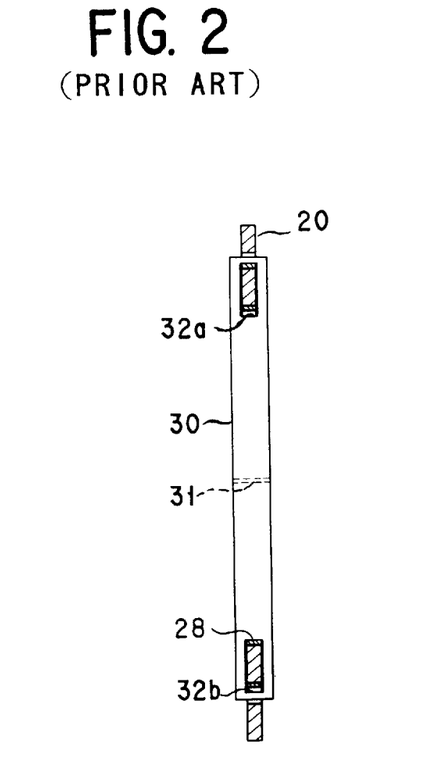
FIG. 2 is a cross section taken through FIG. 1 along the line A—A.

One example of the conventional harness frame of popular acceptance which is constructed as to permit retention of a multiplicity of healds is shown in FIG. 1 and FIG. 2.

A harness frame 20 is possessed of frame parts 21a, 21b, 21c, and 21d one each in four sides thereof. From stated points near the upper and the lower end of each of the lateral frame parts 21c and 21d, pairs of heald shafts 24a, 24b and heald shafts 27a, 27b are extended inwardly. Further, from the opposite sides of a central frame part 22 connecting the upper and the lower frame part 21a, 21b at stated points near the upper and the lower end of the central frame part 22, pairs of heald shafts 25a, 25b and heald shafts 26a, 26b are extended outwardly so as to confront the heald shafts 24a, 24b and the heald shafts 27a, 27b. Thus, gap parts are formed one each between the free ends of the opposed pairs of heald shafts 24a and 25a, 24b and 25b, 26a and 27a, and 26b and 27b. From a stated point of the lower frame part 21b, a supporting member 23 is extended downwardly. This supporting member 23 is connected to the follower of a cam as mentioned above.

Healds 30 are each provided in the central part thereof with a mail 31 for passing a warp thread and near the upper and lower end thereof with insertion holes 32a, 32b for passing heald shafts in a direction perpendicular to that of the mail 31 mentioned above.

The attachment of the healds 30 to the harness frame 20 is accomplished by applying extra bars 28 made of resin or rubber one each to the upper and the lower faces of the heald shafts 24a, 24b, ... 27a, and 27b and then inserting the heald shafts through the insertion holes 32a, 32b of the individual healds 30. The extra bars 28 are intended to absorb the shocks imparted by the vertical reciprocation of the healds 30 on the heald shafts and prevent infliction of abrasive damage to the healds and heald shafts. A set of 12 or 13 healds 30 is attached to each of the pairs of heald shafts 24a and 24b, ... 27a and 27b. An O ring 29 is fitted near the free end of each heald shaft to preclude slippage of healds. The harness is assembled by attaching a stated number of healds 30 (12 or 13 healds×4 portions) to the harness frames 20 as described above. The individual healds 30 are freely slid in a horizontal direction and the intervals between the healds are restricted by a reed and a thread feed part.

Heretofore, steel has been used as the material for various harness frames in looms inclusive of harness frames in such a warp shedding device as described above. In recent years, looms of a new type to be used at a high rate of rotation have been developed and, as a natural consequence, the harness frames to be used in the looms have grown in size. The enlargement of the harness frame, however, is at a disadvantage in adding to the weight of the frame itself, posing the problem of noise, and curtailing the service life owing to the friction caused by such parts as the cam and the cam follower for actuating the frame. On account of these problems, the conventional harness frames which are made of a steel material stand in need of improvement through adoption of a new material that leads to reduction in weight.

Figure 3:
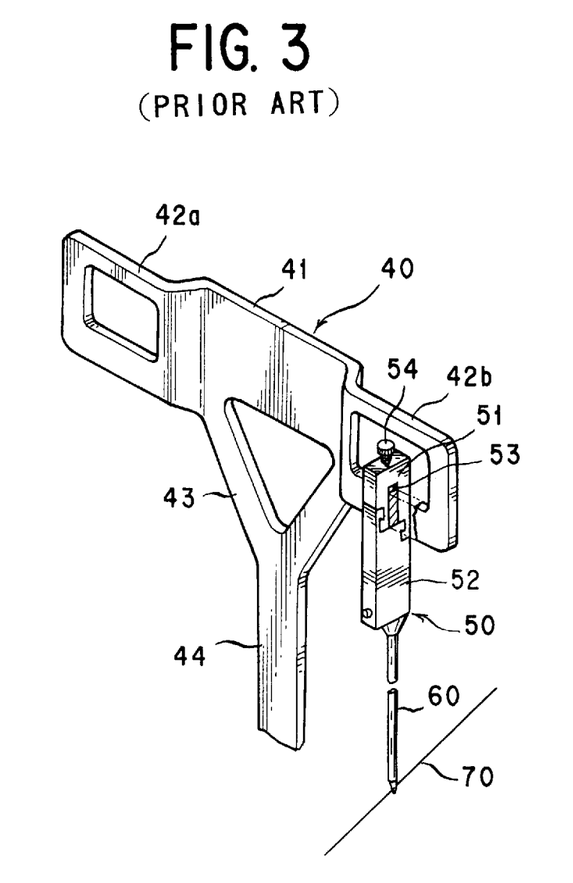
FIG. 3 is a perspective view showing one example of the harness frame to be used in shedding a warp for the purpose of fixing fastener elements on a fastener tape.

In the light of the problems mentioned above, such harness frames for a loom as are disclosed in published Japanese Patent Application, KOKAI (Early Publication) No. (hereinafter referred to briefly as "JP-A-") 7-70,864 have been proposed. JP-A-7-70,864 discloses a narrow loom for fastener stringers that causes rows of spiral coil coupling elements made of synthetic resin to be woven one each in the edge parts of fastener tapes simultaneously with the weaving of the fastener tapes. FIG. 3 shows a harness frame for shedding a warp to be used for the purpose of fixing fastener elements on a fastener tape being woven. A harness frame 40 has a structure comprising a frame body 41 possessed of a lateral pair of rectangular frame parts 42a, 42b, a supporting part 44 connected to the follower (not shown) of a cam, and a skeletal part 43 formed roughly in the shape of the letter V to join the frame body 41 and the supporting part 44. Healds 50 are each divided into two parts, i.e. a lower member 52 having attached fast to the lower end part thereof a needle 60 for retaining a warp thread 70 to be used for fixing fastener elements and an upper member 51. The upper member 51 and the lower member 52 of each of the healds 50 are meshed in a dovetail joint having the lower frame part of the frame part 42b (42a) of the harness frame 40 fitted into a groove 53 formed in the lower part of the upper member 51 and they are strongly fixed to the frame part 42b (42a) by driving a bolt 54 into a screw hole (not shown) formed perpendicularly in the upper part of the upper member 51 until the leading end thereof is pressed against the upper end surface of the lower frame part of the frame part 42b (42a).

JP-A-7-70,864 proposes to attain the reduction in weight mentioned above by adopting as the material for the harness frame 40 mentioned above and for the harness frames to be used in the shedding device for a warp a reinforced composite material that uses such component materials as a reinforcing material and synthetic resin. The fiber-reinforced composite material of this kind, however, has problems yet to be solved in terms of strength and elasticity. The problems mentioned above become particularly prominent in such harness frames as have a relatively large size.

SUMMARY OF THE INVENTION

It is, therefore, an object of the present invention to provide a laminated plate material which, in spite of a generous reduction in its own weight, possesses high strength and ample elasticity and manifests such outstanding processability and noise-abating property as are appropriate for a material used for the manufacture of various harness frames in narrow looms.

Another object of the present invention is to provide a varying harness frame for a narrow loom which is manufactured from the laminated plate material mentioned above and thereby repress the phenomena of inertia and noise which are attendant on the harness frame, a high-speed driving part in the loom, even when the loom is operated at a high speed, preclude the cam and cam follower used for driving the harness frame from incurring undue wear, and allow the operating speed of the loom to be elevated to a point where the productivity of slide fastener tapes or stringers will be exalted.

To accomplish the objects mentioned above, one aspect of the present invention provides a laminated plate material which has a metallic layer and a fiber-reinforced composite material layer as components thereof.

A fundamental embodiment of this aspect of the invention resides in providing a laminated plate material characterized by comprising (a) a composite material layer comprising a resin matrix and a reinforcing layer formed of reinforcing fibers and (b) metallic layers superposed one each on the opposite surfaces of the composite material layer.

In accordance with a preferred embodiment of the present invention, there is provided a laminated plate material characterized by comprising a composite material layer having a plurality of reinforcing layers formed by reticularly weaving reinforcing fibers, the reinforcing layers being embedded substantially parallelly in a matrix of resin, and metallic layers superposed one each on the opposite surfaces of the composite material layer.

Preferably in the laminated plate material of the present invention, the material for the metallic layers is a steel material, a stainless steel material, a titanium material (titanium alloy), or an aluminum material (aluminum alloy), the reinforcing fibers for forming the reinforcing layer are glass fibers, carbon fibers, or aromatic polyamide (aramid) fibers, and the resin material is a thermoplastic resin or a thermosetting resin, preferably a thermoplastic resin. The reinforcing layer is preferably selected from the group consisting of a random mat of reinforcing fibers, cloth of reinforcing fibers, unidirectionally oriented fibers, and multidirectionally oriented fibers.

Another aspect of the present invention resides in providing a harness frame for a loom that is manufactured from the laminated plate material mentioned above. In a preferred embodiment of this aspect of the invention, the total thickness of the laminated plate material is in the range of 0.5 to 3.0 mm, the thickness of each of the metallic layers is in the range of 0.05 to 0.4 mm, and the surface hardness of the metallic layers is not less than 100 DPN on the Vickers hardness scale (Hv).

The term "harness frame" as used in this specification embraces various harness frames such as the harness frames which are used in a shedding device for a warp and the harness frames which are used in shedding warp threads for the purpose of fixing fastener elements on fastener tapes excepting the term evidently indicates a specific frame.

BRIEF DESCRIPTION OF THE DRAWINGS

Other objects, features, and advantages of the invention will become apparent from the following description taken together with the drawings, in which.

DETAILED DESCRIPTION OF THE PREFERRED EMBODIMENTS

The laminated plate material of the present invention enjoys light weight, exhibits elasticity and rigidity properly, and excels in the ability to absorb and abate noise because it is formed mainly of a fiber-reinforced resin composite material. It abounds in mechanical strength, wear resistance, and surface hardness because metallic layers are superposed one each on the opposite surfaces of the main layer made of this composite material. The laminated plate material of the present invention allows not only the kind of the material for the metallic surface layers but also the thickness and the surface condition of these layers and the kind and the thickness of the composite material layer as well to be suitably selected. It, therefore, can be applied in various functional members which are demanded to excel in strength and wear resistance and enjoy light weight.

Particularly the fact that the laminated plate material of the present invention is adopted as the material for harness frames in a loom means that the harness frames can be manufactured from a solid structural material. The harness frames manufactured from the laminated plate material, therefore, are substantially free from such problems of the harness frames manufactured from the conventional fiber-reinforced composite material as the inferior rigidity and the phenomenon of "play" suffered to occur where the frames are joined with a cam follower. They further excel the harness frames which are manufactured from the conventional fiber-reinforced composite material and aluminum material in strength and wear resistance. They are lighter than the harness frames which are manufactured from a steel material. Thus, they not only enjoy their own durability but also allow the cam, the cam follower, etc. which aid in actuating them to be relieved of the burden of wear. By manufacturing various harness frames of a narrow loom from the laminated plate material of this nature, therefore, the harness frames which are high-speed driving parts in the loom are enabled to suppress inertia and noise even when the loom is operated at a high speed. Further, the fact that the loom is allowed to be operated at an increased speed adds to the productivity of slide fastener tapes or stringers.

Various metals which are hard and are excellent in wear resistance and mechanical strength can be adopted as the material for the metallic layers to be used in the laminated plate material of the present invention. Among other metals which answer this description, the steel material, stainless steel material, titanium material (titanium alloy), and aluminum material (aluminum alloy) prove particularly advantageous in terms of strength, wear resistance, and weight. Especially, the stainless steel material can be used particularly advantageously because it avoids producing rust and excels in repeated fatigue properties. The thickness, surface conditions (surface roughness and hardness), and other factors of the metallic layers can be freely selected. Since the surface hardness of the metallic layers heavily affects the wear resistance of the surface and the rigidity of the whole harness frames, it preferably exceeds a Vickers hardness (Hv) of 100 DPN.

The composite material which composes the inner layer of the laminated plate material is made of a resin containing reinforcing fibers. Thermoplastic resins and thermosetting resins are usable for the resin mentioned above. Particularly, such thermoplastic resins as polyamides (PA), polycarbonates (PC), polypropylene (PP), polyphenylene sulfide (PPS), polyphenylene oxide (PPO), and polyesters prove favorable from the viewpoints of characteristics and processability. From the viewpoint of the resistance of material to fatigue, thermoplastic resins which have such long fibers as glass fibers, carbon fibers, and aramid fibers represented by Kevlar® fibers (aramid fibers produced by DuPont) which measure not less than 1 mm in length incorporated therein are preferably used. Especially, a composite material of excellent resistance to fatigue which has reinforcing fiber layers formed of random materials or cloth materials of the fibers mentioned above or formed of the fibers oriented either unidirectionally or multidirectionally and buried as a reinforcing material in a matrix of nylon type resin manifesting highly satisfactory adhesiveness to the reinforcing fibers proves appropriate. The content of the reinforcing fibers in the composite material is preferably in the range of 30 to 75% by weight from the viewpoints of such characteristics as strength and rigidity.

The overall thickness of the laminated plate material constructed as described above is adjusted to suit the particular use for which the material is applied. For the laminated plate material to be used as harness frames, for example, the preferred overall thickness of the material appropriately falls in the range of 0.5 to 3.0 mm, most preferably 1.0 to 3.0 mm. If the thickness is less than 0.5 mm, the harness frames will be deficient in rigidity (strength). Conversely, if the thickness exceeds 3.0 mm, the harness frames will not only have an unduly large weight but also incur difficulty in inserting an ample pitch therebetween.

The metal layers which are superposed one each on the opposite surfaces of the composite material layer preferably have a thickness in the range of 0.05 to 0.4 mm. If this thickness of the metallic layers is less than 0.05 mm, the metallic layers will fail to manifest necessary effects in terms of strength and wear resistance and will be compelled to sacrifice such factors of workability as adhesiveness and ease of cutting on account of unduly small thickness and further suffer an undue rise of cost of the laminated plate material. Conversely, if the thickness exceeds 0.4 mm, though the metallic layers prove satisfactory in terms of strength and wear resistance, the consequent increase in weight poses the problem that the laminated plate material will fail to enjoy the merit of light weight.

The thickness of the composite material layer as the intermediate layer coupled with the thickness of the metallic layers mentioned above is not particularly restricted so long as the total thickness of the laminated plate material falls within the range mentioned above. In other words, the thickness of the laminated plate material can be adjusted by suitably changing the thickness of the composite material layer.

Figure 4:
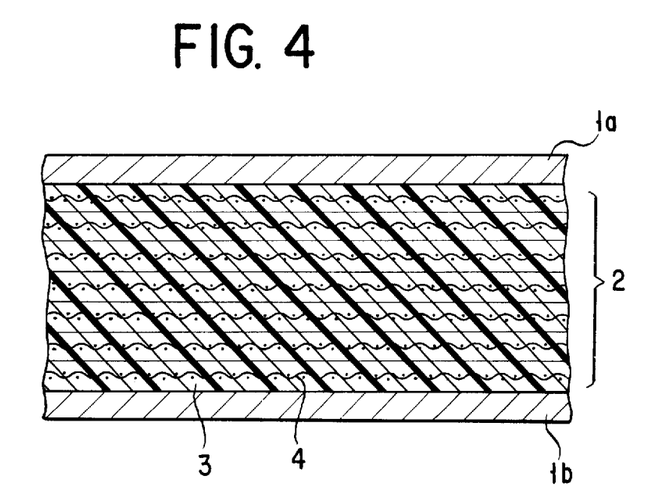
FIG. 4 is a fragmentary cross section showing one example of the layer construction of a laminated plate material of the present invention.

When the reinforcing fibers which are used as a reinforcing material in the composite material happen to be two-dimensional fibers, it is more advantageous to form the intermediate layer with a plurality of layers as shown in FIG. 4 than to form it with a single layer of composite material because the produced laminated plate material enjoys an addition to strength. To be specific, the intermediate layer may be formed by superposing as many composite material layers as is necessary to give a thickness in the range of 0.15 to 0.2 mm to the unit composite material layer after the step of pressing. The total thickness of the intermediate layer can be easily controlled by suitably selecting the number of component layers to be superposed.

When three-dimensional fibers are adopted as the reinforcing fibers, though the intermediate layer may comprise a plurality of composite material layers including the three-dimensional fibers similarly to those including two-dimensional fibers mentioned above, the intermediate layer formed of a sole composite material layer including these three-dimensional fibers acquires ample strength.

The laminated plate material that has such a laminar structure as mentioned above has a weight less than one half of the weight of a steel plate and strength roughly intermediate between an aluminum plate and a steel plate.

Now, the method for producing the laminated plate material of the present invention possessing the structure mentioned above will be described below.

The laminated plate material of the present invention that comprises two metallic layers and an intervening composite material layer is produced by either interposing a plate of composite material prepared in advance by incorporating the aforementioned long fibers therein between two metallic sheets destined to form surface layers or interposing alternately superposed resin sheets and mats or cloths of reinforcing fibers between the two metallic sheets and inducing fast adhesion of the composite material and the metallic sheets.

Though this adhesion may be attained by the use of an adhesive agent, it is preferably accomplished by means of thermal fusion of resin. The production of the laminated plate material by thermal welding is fulfilled by using a thermoplastic resin as the resin mentioned above, interposing the composite material mentioned above or alternately superposed thermoplastic resin sheets and reinforcing fiber layers between the two metallic sheets, and heating the tacked layers while applying pressure thereto from the surfaces of the two metallic sheets in the direction of superposition. The heating temperature, the pressing force, and the duration of thermal treatment are variable with the material, particularly the resin, selected to be used. The standard for this treatment is that the tacked layers be heated until the resin is melted and allowed to flow thoroughly at a temperature in the approximate range of 200° to 550° C. and compressed with a pressing machine under a pressure in the range of 3 to 200 kg/cm² for a period in the approximate range of 20 to 60 minutes. Actually, the heating temperature, the pressure, and the durations of their application may be set based on the data regarding the materials to be used and the results of preliminary experiments performed thereon.

When the combined layers which have undergone the treatment mentioned above are left cooling, they give rise to the laminated plate material of the present invention which has the component layers bound strongly.

When the metallic sheets are given a surface treatment with a silane coupling agent before the tacked layers are subjected to thermal welding, the layers subsequently fixed by the thermal welding suffer from no large dispersion of thickness and the laminated plate material ultimately produced exhibits excellent adhesive strength. The silane coupling agent has a composition represented by the general formula, $Y-CH_2SiX_3$, wherein X stands for an alkoxy group readily reacting with an inorganic substance or a hydrolyzable substituent such as a halogen and Y for a vinyl group, an epoxy group, or an amino group readily reacting with an organic substance. As concrete examples of the silane coupling agent, γ-aminopropyl triethoxy silane, γ-glycidoxypropyl trimethoxy silane, γ-methacryloxypropyl trimethoxy silane, and vinyl tri-β-methoxyethoxy silane may be cited. A silane coupling agent which has a substituent fit for the kind of the metallic layers and the kind of the resin for the matrix of the composite material layer may be selected and used. By treating the inner surfaces of the metallic layers with the silane coupling agent before the production of the laminated plate material, the strength of adhesion of the metallic layers and the composite material layer can be exalted without requiring use of an adhesive agent.

Now, one example of the method adopted appropriately for the production of the laminated plate material of the present invention will be described below with reference to FIG. 4 and FIG. 5.

Figure 5:
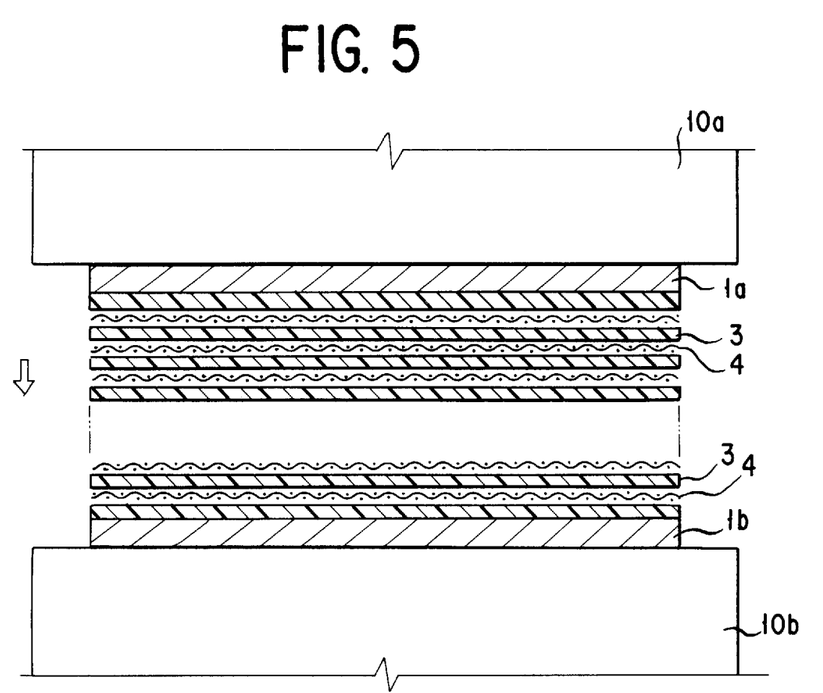
FIG. 5 is a partially sectioned side view showing one example of the method for producing the laminated plate material of the present invention.

First, a metallic sheet 1b treated in advance with a silane coupling agent is disposed on a lower mold 10b of a pressing machine with the treated surface falling on the upper side as shown in FIG. 5. On the metallic sheet 1b, resin sheets 3 and reinforcing fiber layers, preferably plain weave cloth materials 4 of glass fibers, are alternately superposed, a resin sheet 3 is placed on top of the alternately superposed layers, and a metallic sheet 1a similarly surface treated with a silane coupling agent is disposed with the treated surface falling on the lower side. Then, the superposed layers consequently formed are sandwiched with an upper mold 10a and the lower mold 10b of the pressing machine and heated to a stated temperature (about 200° to 550° C. ) and meanwhile compressed with a surface pressure in the approximate range of 3 to 200 kg/cm² for a stated period of time. As a result, a laminated plate material which has the metallic layers 1a and 1b superposed with high adhesive strength one each on the opposite surfaces of a composite material layer 2 having a plurality of cloth materials 4 embedded in the form of parallelly superposed layers (a total of seven layers in the depicted case) in a resin matrix having the resin sheets 3 integrally fused and welded as shown in FIG. 4 is obtained.

Figure 6:
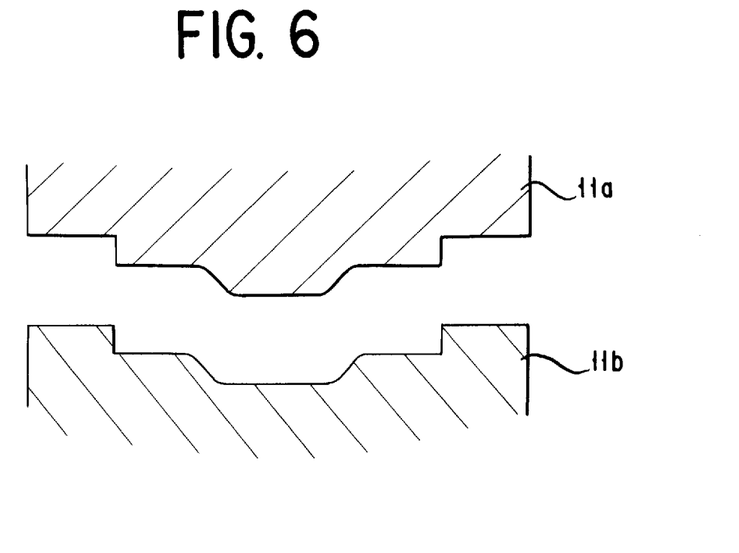
FIG. 6 is a fragmentary cross section showing an example of a metal die for a pressing machine to be used for the production of the laminated plate material of the present invention.

FIG. 6 shows in cross section metal molds of a pressing machine useful for the manufacture of the harness frame 40 having such a bent part as shown in FIG. 3. The lower surface and the upper surface respectively of an upper mold 11a and a lower mold 11b are shaped in contours conforming to the shape of the harness frame 40. The laminated plate material to be used for the manufacture of the harness frame 40 of this shape can be manufactured by the same method as described above, excepting the pressing machine which is provided with molds shaped as shown in FIG. 6 is used.

The laminated plate material which is manufactured as described above can be applied in various formed members which demand the rigidity and strength inherent in metal and the light weight inherent in resin. When it is applied in the harness frame of a loom mentioned above, for example, it can be cut into a required shape by means of laser cut, water jet cut, NC cutting device, or a pressing device.

EXAMPLES

A stainless steel sheet 0.2 mm in thickness treated in advance with a silane coupling agent (γ-aminopropyl triethoxy silane) was placed on the lower mold of the pressing machine with the treated surface thereof falling on the upper side as shown in FIG. 5. On the stainless steel sheet, seven resin (nylon 6) sheets and seven plain weave cloth materials of glass fibers were alternately superposed so that the total amount of the cloth materials would account for 65% by weight and a resin sheet was finally superposed. On the superposed layers thus obtained, a stainless steel sheet 0.2 mm in thickness similarly treated in advance with a silane coupling agent (γ-aminopropyl triethoxy silane) was placed with the treated surface falling on the lower side. Then, with the upper mold 10a and the lower mold 10b of the pressing machine, the superposed layers were heated to a temperature in the range of 200° to 250° C. and pressed under a surface pressure in the range of 10 to 60 kg/cm² for 60 minutes. The combined layers obtained after the pressing were left cooling. Thus, a laminated plate material 1.5 mm in thickness was obtained.

The laminated plate material thus produced was tested for physical properties. An aluminum plate and a steel plate (YG-4) of the same size were similarly tested. The test results are shown in Table 1 for the sake of comparison.

TABLE 1

| Material | Specific gravity | Modulus in flexure (kg/mm²) | Bending strength (kg/mm²) |
| --- | --- | --- | --- |
| Laminated plate material of the invention | 3.4 | 10,110 | 20 |
| Aluminum plate | 2.7 | 7,000 | 14 |
| Steel plate (YG-4) | 7.8 | 21,000 | 28 |

It is clearly noted from Table 1 that the laminated plate material mentioned above was slightly inferior to the aluminum plate in terms of lightness of weight and was superior to the aluminum plate in modulus in flexure and bending strength. Though it was inferior to the steel plate (YG-4) in terms of modulus in flexure and bending strength, it had a specific gravity less than one half of that of the steel plate and was superior thereto in terms of lightness of weight. It is concluded that the laminated plate material possessed physical properties which were intermediate between those of the aluminum plate and those of the steel plate.

Then, two kinds of harness frames were manufactured from each of the two materials, i.e. the laminated plate material and the steel plate (YG-4) of popular use to date. The differences in weight between the two kinds of harness frames due to the materials used therein are shown in Table 2.

TABLE 2

| Name of loom used | Material | Weight (g) | Ratio of decrease in weight (%) |
|---|---|---|---|
| Fastener chain manufacturing device | Laminated plate material of the invention | 137 | 56.5 |
| | YG-4 | 315 | |
| Four-arm needle loom | Laminated plate material of the invention | 103 | 57.4 |
| | YG-4 | 242 | |

It is clearly noted from Table 2 that the harness frames manufactured from the laminated plate material were notably lighter than those manufactured from the conventional material and that their weights were invariably less than half of those of both harness frames of the conventional material.

Figure 7:
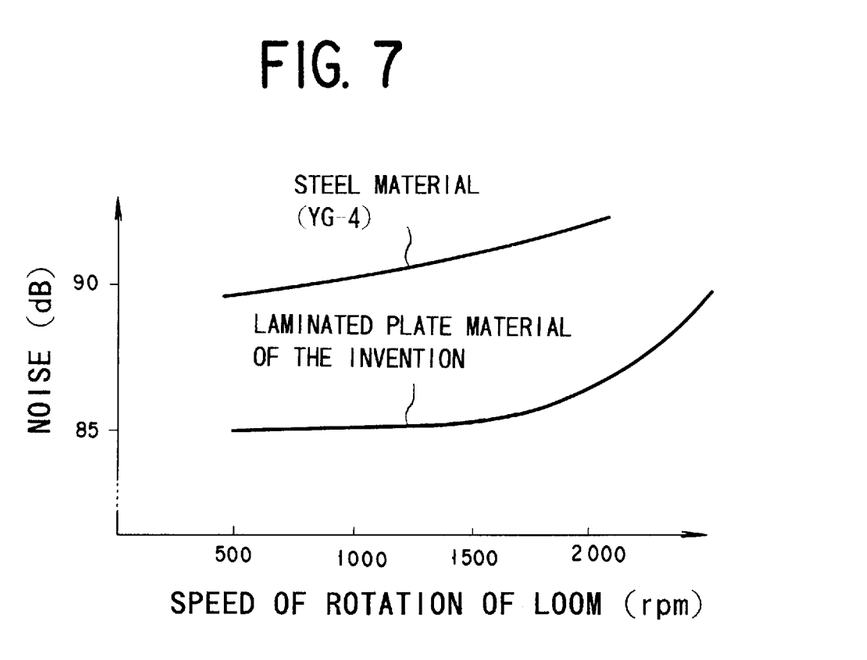
FIG. 7 is a graph showing the relation between the speed of rotation and the noise obtained of a loom using harness frames made of the laminated plate material of the present invention and a loom using harness frames made of a conventional steel material (YG-4)

Then, the looms actually using the harness frames mentioned above were operated and the noises they emitted during the operation were measured. The data obtained herein are shown for comparison in FIG. 7. When the harness frames made of the conventional steel plate (YG-4) were used, the looms emitted noise in the neighborhood of 90 dB at an operating ratio in the range of 500 to 1000 rpm and the noise level increased in proportion as the speed of rotation increased. In contrast, when the harness frames made of the laminated plate material were used, the looms emitted noise approximating 85 dB at an operating ratio in the neighborhood of 500 to 1600 rpm and the noise level became constant near 85 dB. The noise tended to increased gradually when the operating ratio exceeded 1600 rpm.

Figure 8:
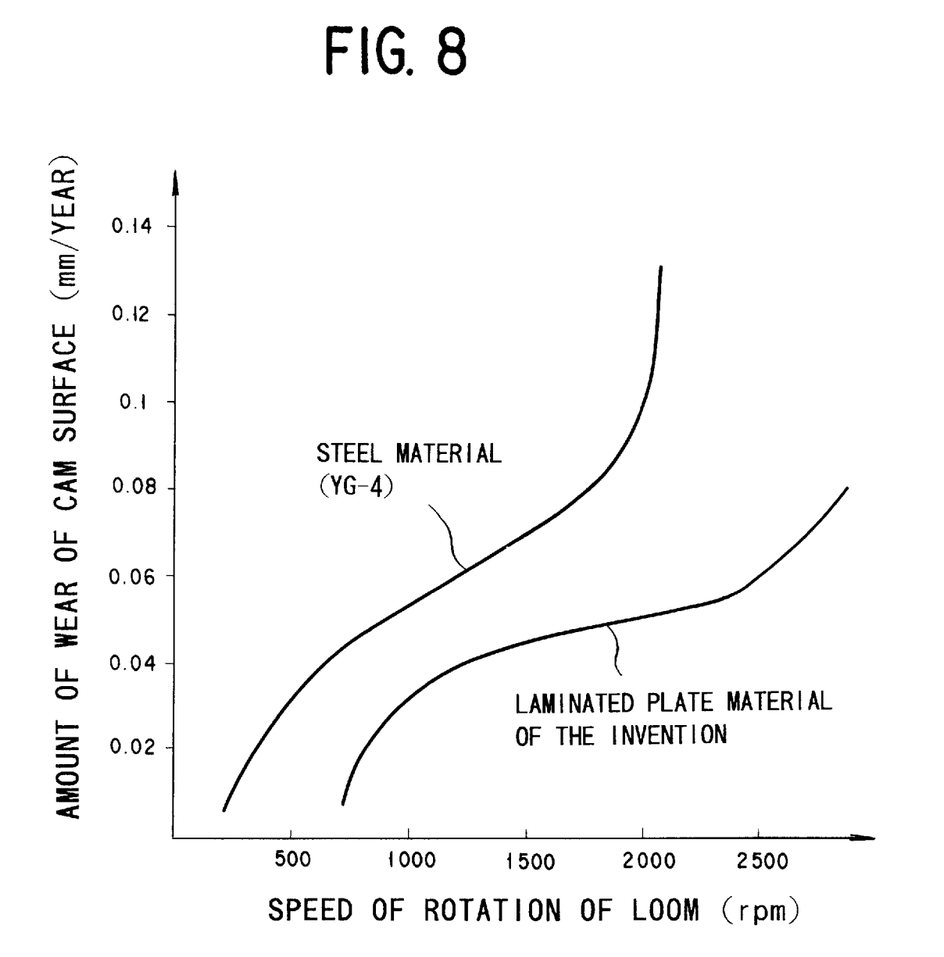
FIG. 8 is a graph showing the relation between the speed of rotation and the amount of wear of the surface of a cam for actuating a harness frame obtained of a loom using harness frames made of the laminated plate material of the present invention and a loom using harness frames made of a conventional steel material (YG-4).

As respects the service life of cams used for actuating the harness frames, the amounts of wear of the surface of cam were measured to determine the relation between the speed of rotation and the amount of wear of cam surface. The results are shown in FIG. 8. It is clearly noted from FIG. 8 that the harness frames manufactured from the laminated plate material of the present invention were used, the cams used for actuating the harness frames showed a notable decrease in the amount of surface wear. It is inferred from these results that since the harness frames according to the present invention had notably decreased weights, the loads exerted on the cams used for actuating the harness frames were lowered proportionately and the amounts of surface wear of these cams were accordingly decreased.

While certain specific embodiments and working examples have been disclosed herein, the invention may be embodied in other specific forms without departing from the spirit or essential characteristics thereof. The described embodiments and examples are therefore to be considered in all respects as illustrative and not restrictive, the scope of the invention being indicated by the appended claims rather than by the foregoing description and all changes which come within the meaning and range of equivalency of the claims are, therefore, intended to be embraced therein.

What is claimed is:

1. A harness frame for a loom, comprising a harness frame body defined by a laminated plate material, said laminated plate material comprising (a) a composite material layer having opposed major surfaces and (b) metallic layers superposed on each of said opposed major surfaces, said composite material layer comprising a resin matrix selected from the group consisting of polyamides, polycarbonates, polypropylene, polyphenylene sulfide, polyphenylene oxide and polyesters; and from about 30 to about 75% by weight, based on the weight of the composite material layer of a plurality of reinforcing sheet layers, each sheet layer comprising reticularly woven reinforcing fibers, the reinforcing sheet layers being embedded in the resin matrix substantially parallel to each other.

2. A harness frame for a loom, comprising a harness frame body having a laminated plate material construction comprising:

(a) an intermediate composite material layer having a pair of opposed major surfaces, said intermediate composite material layer comprising a resin matrix and from about 30 to about 75% by weight, based on the weight of the intermediate composite material layer, of a plurality of reinforcing sheet layers of reticularly woven reinforcing fibers selected from the group consisting of glass fibers, carbon fibers and aramid fibers, the reinforcing sheet layers being embedded in the resin matrix substantially parallel to each other, and (b) two metallic surface layers superposed on each of said opposed major surfaces of the intermediate composite material layer.

3. A harness frame according to claim 2, wherein said metallic layers are made of stainless steel alloy.

4. A harness frame according to claim 2, wherein the total thickness of the laminated plate material is in the range of from about 0.5 to about 3.0 mm and the thickness of each of said metallic layers is in the range of from about 0.05 to about 0.4 mm.

5. A harness frame according to claim 2, wherein said resin matrix is selected from the group consisting of polyamides, polycarbonates, polypropylene, polyphenylene sulfide, polyphenylene oxide and polyesters.

6. A harness frame according to claim 2, wherein each said reinforcing sheet layer is a plain weave cloth of reinforcing fibers.

7. A harness frame according to claim 2, wherein each said metallic layer has an inner surface treated with a silane coupling agent.

* * * * *